(12) United States Patent
Ryu

(10) Patent No.: US 6,633,522 B2
(45) Date of Patent: Oct. 14, 2003

(54) FOCUS PULL-IN METHOD AND OPTICAL DISK DEVICE

(75) Inventor: Tomoaki Ryu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,662

(22) Filed: Feb. 23, 2001

(65) Prior Publication Data

US 2001/0017826 A1 Aug. 30, 2001

(30) Foreign Application Priority Data

Feb. 25, 2000 (JP) .................................... P2000-049392

(51) Int. Cl.$^7$ ................................................. G11B 7/00
(52) U.S. Cl. ................................ 369/44.29; 369/44.35; 369/53.23
(58) Field of Search ........................... 369/44.25, 44.27, 369/44.29, 44.35, 44.36, 44.41, 47.55, 53.23, 53.28, 53.37, 94

(56) References Cited

U.S. PATENT DOCUMENTS

| 5,060,215 A | | 10/1991 | Kawamura et al. | |
|---|---|---|---|---|
| 5,140,576 A | | 8/1992 | Yamada et al. | |
| 5,499,231 A | | 3/1996 | Fennema et al. | |
| 5,740,136 A | * | 4/1998 | Tsutsui et al. ............ | 369/44.27 |
| 5,757,744 A | | 5/1998 | Akkermans | |
| 6,011,762 A | | 1/2000 | Watanabe et al. | |
| 6,061,310 A | | 5/2000 | Iida | |
| 6,101,157 A | * | 8/2000 | Bradshaw et al. ........ | 369/44.29 |
| 6,246,646 B1 | * | 6/2001 | Abe et al. ................. | 369/44.27 |
| 6,256,273 B1 | | 7/2001 | Matsuda et al. | |
| 6,370,093 B1 | * | 4/2002 | Tada et al. ................ | 369/44.27 |

FOREIGN PATENT DOCUMENTS

| EP | 0 713 217 A2 | 5/1996 |
|---|---|---|
| JP | A6150335 | 5/1994 |
| JP | 10 302272 | 11/1998 |
| JP | 11 031325 | 2/1999 |

OTHER PUBLICATIONS

Patent Abstracts of Japan, vol. 1999, No. 05, May 31, 1999.
Patent Abstracts of Japan, vol. 1999, No. 02, Feb. 26, 1999.

* cited by examiner

Primary Examiner—Paul W. Huber
(74) Attorney, Agent, or Firm—Birch, Stewart, Kolasch & Birch, LLP

(57) ABSTRACT

In a focus control of an optical disk with a fast reproduction velocity and a large face deflection, the present invention can effect a mistakeless and reliable focus pull-in method. The present invention comprises: means for applying a braking signal to a focus actuator before closing a focus control loop; means for detecting a reversal of a relative velocity between an objective lens performing a focus search operation and an optical disk which effects an up-and-down motion due to the face deflection; and means for detecting the relative velocity between the objective lens and the optical disk from a focus error signal which is detected in each layer of a multi-layer disk.

12 Claims, 12 Drawing Sheets

F/G. 8

FOCUS PULL-IN METHOD AND OPTICAL DISK DEVICE

BACKGROUND OF THE INVENTION

1. Field of the Invention

The present invention relates to a method for controlling a light spot on a recording layer of an optical disk.

2. Description of the Background Art

FIG. 10 denotes an example of a circuit configuration for realizing focus pull-in to a recording layer of optical disk such as a CD, DVD or the like. In the figure, reference numeral 0 denotes a light emitting optical system containing a semiconductor laser diode (LD), reference numeral 1 denotes an optical disk, 2 an objective lens, 3 a focus actuator which is rigid-body-like connected to the objective lens 2 and disposed in a magnetic circuit, 4 a half-mirror, 5 a photo-electric conversion element, 6 a focus error detector, 7 a phase compensator, 8 a change-over switch, 9 a driver amplifier, 10 a search waveform generator, 11 a zero-crossing detector for a focus error signal, 12 an AND circuit taking a logic product of a second control signal E from an external host device such as a microcomputer or the like and an output of the zero-crossing detector 11 and 13 an addition amplifier producing a whole addition signal.

FIG. 11 denotes a view showing an operation of each signal at a time of focus pull-in of a CD or DVD. In the figure, a symbol A denotes a focus drive signal which is output from the driver amplifier 9 to be applied to the focus actuator 3, B a focus error signal output from the focus error detector 6 (a pointer which directs a positional relationship between the optical 1 and the objective lens 2), C a total additional signal which is output from the addition amplifiers 13 and sums up totally the photo-electric conversion signals obtained from each area of the photo-electric conversion elements 5, D a first control signal which a total addition signal C is over a predetermined threshold value S and becomes "H" at a zero-crossing point of the focus error signal, E a second control signal from the host device which is "H" when the focus control loop is closed and is "L" when it is open, F a third control signal which the change-over switch 8 selects the focus control signal in a case of "H" and selects the focus search signal in a case of "L", T1 the zero-crossing point of the focus error signal and Sr 2 a threshold value of the total addition signal for detecting a valid focus error signal.

A description will be given to a general focus pull-in operation hereinafter. As usual, a pull-in range of a focus servo lies in a relatively narrow range of a several to twenty μm. In order to pull-in a focus servo, it is necessary to shift the focus actuator 3 up to the pull-in range of the focus servo. For example, one Hz of saw tooth search waveform is output from the search waveform generator 10. When a system is not a mode which closes the focus control loop, as a second control signal E from a host device is "L", a third control signal F becomes "L" and a focus search signal is selected at the change-over switch 8. In this case, a search waveform is input to the driver amplifier 9 to drive a focus actuator 3. Based on the search waveform, a focus search operation that an objective lens 2 comes close to an optical disk 1 or goes away therefrom is carried out.

A focus error signal is a signal based on a reflection light from the optical disk 1 which changes together with the focus search operation and a laser light which is projected from a semiconductor laser diode (LD) 0 and reflected at a recording surface of the optical disk 1, is received by the photo-electric conversion element 5 and detected by the focus error detector 6, for example, by using a well known astigmatism method. The focus error signal detected herein is output to a phase compensator 7, which is formed by a phase-lead filter which leads a phase of the band width near 1 KHz and a suitable servo gain is given here. After the focus error signal obtains an adequate phase and a gain characteristic, the signal will be output to the change-over switch 8 as a focus control signal.

The focus error signal is also output to the zero-crossing detector 11. The zero-crossing detector 11 outputs a first control signal D that, when a signal level of the whole addition signal is over a predetermined threshold value Sr2 and the focus error signal detects a zero-crossing point T1, the zero-crossing detector 11 becomes "H", while when a signal level of the whole addition signal is less than a predetermined threshold value Sr2, the zero-crossing detector 11 becomes "L".

In this case, if the system is in a mode which closes the focus control loop, as a second control signal E from the host device becomes "H" and a third control signal F from the zero-crossing detector 11 is valid, a change-over switch 8 selects a focus control signal at a zero-crossing point T1 of the focus error signal and the focus actuator 3 is activated. Thus, a pull-in operation for the focus control is effected.

When a rotational drive of a disk is generally activated, a face deflection occurs. An absolute quantity of the face deflection is decided by a standard of each disk. As for DVD, ±300 μm is a standard limit. For example, when a DVD of the standard limit is driven by one double velocity, a rotational speed at the most internal circumference part of a disk is about 23 Hz, and suppose that an amount of the face deflection quantity is proportional to a radius of the disk, the face deflection is about ±125 μm at the most internal circumference, and the maximum face deflection velocity is about 18 mm/sec according to the following expression.

$$V = A \cdot \pi \cdot f \cdot \cos(2\pi \cdot f \cdot t)$$

where V is the face deflection velocity, A is an amount of face deflection and f is a rotational frequency.

On the other hand, since a speed of focus search is generally 10 mm/sec, the relative velocity between an objective lens and an optical disk is 30 mm/sec at the most. (This corresponds to a sum of the largest face deflection and the focus search speed.) As a rule, a pull-in capability of focus control depends on a phase compensation filter, a setting amount of gain, a sensitivity of the focus actuator or the like, and is 30 mm/sec, more or less. Since the pull-in capability exceeds the largest relative velocity of the objective lens and optical disk in all the region, it is possible to close a focus control loop.

Recently, a reproduction speed of the optical disk device became higher year by year and accordingly, the rotational speed of the disk has been made higher. For example, at the most internal circumference of CD, it is 16 times, and at that of DVD, the rotational speed is about four times. Considering a case of four times of DVD reproduction speed, and if the face deflection amount of the disk is ±300 μm in the standard limit, the largest face deflection velocity at the most internal circumference part is about ±70 mm/sec, and the maximum relative velocity is 80 mm/sec, where the speed for focus search is 10 mm/sec. As described above, since a possible velocity for pulling-in of the focus control system is usually 30 mm/sec, as shown in FIG. 12, there is very little region that the relative velocity of the objective lens and the optical disk is less than 30 mm/sec and it is seen that it is quite difficult to pull-in the focus control.

FIG. 12 shows a timely variation of the relative velocity between the optical disk and the objective lens and a horizontal axis shows a time(sec) and a vertical axis a relative velocity (mm/sec). A thick line at 10 mm/sec of the relative velocity shows the focus search velocity. An area between 10 mm/sec to ±30 mm/sec shows an area which the focus servo system can pull-in.

As described above, according to the prior art focus servo pull-in method, when the face deflection of the disk is large, the reproduction speed is fast, it often fails in the pull-in operation of servo. Therefore, it is a serious problem that as things stand, scarcely any servo can pull-in.

SUMMARY OF THE INVENTION

According to a first aspect of the present invention, a focus pull-in method for pulling-in a light spot irradiated through an objective lens onto a recording layer of an optical disk (1) using a focus actuator (3) which can move a position of the objective lens (2) comprises the steps of: (a) applying a search voltage to the focus actuator (3) to drive the objective lens to a direction for approaching to a focusing plane of the optical disk; (b) detecting whether or not a focus error signal (B) which is based on a reflected light from the optical disk attains a first signal level; (c) applying a braking signal indicating a stop of operation to the focus actuator, when it is detected in the step (b) that the focus error signal reaches the first signal level; and (d) starting the predetermined focus control, when a zero-crossing of the focus error signal is detected in the term for allowing the control start.

Preferably, according to a second aspect of the present invention, in the focus pull-in method of the first aspect, the step (b) is performed in which the first signal level is set to a quarter extent level of a peak value of the focus error signal or several times extent of a noise component superposed on the focus error signal.

Preferably, according to a third aspect of the present invention, in the focus pull-in method of the first aspect, the step (c) includes a step of applying the braking signal, when it is detected that all addition signals based on a reflected light from the optical disk exceed a second signal level and the focus error signal reaches the first signal level in the term for allowing the control start.

Preferably, according to a fourth aspect of the present invention, in the focus pull-in method of the first aspect, the braking signal applied by the step (c) indicates a stop of operation at the energy such that the maximum relative velocity between the objective lens and the optical disk can be reduced to the pull-in limit velocity for the predetermined focus control.

Preferably, according to a fifth aspect of the present invention, in the focus pull-in method of the first aspect, the step (c) includes a step of stopping the application of the braking signal, when a reversal of relative velocity between the objective lens and the optical disk is detected in the course of applying the braking signal.

Preferably, according to a sixth aspect of the present invention, the focus pull-in method of the first aspect further comprises a step of: (e) obtaining the relative velocity between the objective lens and the optical disk, and the step (c) includes a step of controlling an output time and/or an output level of the braking signal in response to the relative velocity obtained by the step (e).

Preferably, according to a seventh aspect of the present invention, in the focus pull-in method of the sixth aspect, the optical disk includes a first and second recording layers, and the step (e) includes a step of obtaining a first detection time of the focus error signal detected with respect to the first recording layer and a second detection time of the focus error signal detected with respect to the second recording layer, to obtain the relative velocity based on a time difference between the first and second detection times.

Preferably, according to an eighth aspect of the present invention, an optical disk device having a focus control loop and a focus search loop comprises an objective lens (2) for forming a light spot on a recording layer of an optical disk (1); optical detection means (5, 13, 6) receiving a reflected light from the optical disk for outputting a focus error signal based on the received reflected light; a search waveform generation means (10, 15, 8) for generating a search voltage for driving the objective lens to a direction which approaches to a focusing plane of the optical disk in response to a focus search instruction; a braking signal generation means (14, 16) for generating a braking signal indicating a stop of operation to the focus actuator, when it is detected that the focus error signal reaches the first signal level during a term for allowing a control start of a predetermined focus control; a zero-crossing detector (11) for detecting that a focus error signal reaches a state of zero-crossing; and means (12, 8) for reopening the predetermined focus control, when the zero-crossing detector detects zero-crossing during the term for allowing the control start.

Preferably, according to a ninth aspect of the present invention, in the optical disk device of the eighth aspect, the first signal level includes a quarter extent level of a peak value of the focus error signal or several times extent level of a noise component superposed on the focus error signal.

Preferably, according to a tenth aspect of the present invention, in the optical disk device of the eighth aspect, the optical detection means comprises: a photoelectric conversion element (5) for providing a photoelectric conversion signal by photoelectric conversion of the reflected light; and an addition amplifier (13) for totally adding the photoelectric conversion signal obtained from each area of the photoelectric conversion element to obtain all addition signals, and the braking signal generation means generates the braking signal, when the all addition signals exceed a second signal level and the focus error signal reaches the first signal level during the term for allowing the control start.

Preferably, according to an eleventh aspect of the present invention, in the optical disk device of the eighth aspect, the braking signal includes a signal that indicates a stop of operation at the energy which can reduce the maximum relative velocity between the objective lens and the optical disk to a pull-in limit velocity of the predetermined focus control.

Preferably, according to a twelfth aspect of the present invention, the optical disk device of the eighth aspect further comprises: a braking signal suspension means (17 to 19) having a relative velocity reversal detector (17) for detecting a reversal of the relative velocity between the objective lens and the optical disk, based on the focus error signal, for stopping an application of the braking signal, when the relative velocity reversal detector detects a reversal of the relative velocity during an application of the braking signal.

Preferably, according to a thirteenth aspect of the present invention, the optical disk device of the eighth aspect further comprises: a relative velocity reversal detector (10) for detecting a reversal of the relative velocity between the objective lens and the optical disk, based on the focus error signal, and the braking signal generation means controls an output time and/or an output level of the braking signal in response to the relative velocity.

Preferably, according to a fourteenth aspect of the present invention, in the optical disk device of the thirteenth aspect, the optical disk includes a first and second recording layer, and the relative velocity reversal detector obtains the relative velocity from a time difference between a first detection time of a focus error signal detected with respect to the first recording layer and a second detection time of a focus error signal detected with respect to the second recording layer.

According to the focus pull-in method of the present invention of a first aspect, before a predetermined focus control is performed, a braking signal is applied to make the relative velocity between the objective lens and the optical disk to reduce up to a velocity which a focus servo system including a focus actuator can pull-in entirely. Therefore, a face deflection of the optical disk is large and even when the reproduction velocity is fast, the pull-in of the focus servo which does not end in failure is realized.

According to the invention of a second aspect, since a first signal level which is a threshold level of a focus error signal is set to about one fourth of a peak value of the focus error signal or to several times of noise component which is superposed to the focus error signal, an erroneous generation of the braking signal can be prevented.

Further, according to the invention of a third aspect, since a braking signal is made to generate only when all addition signal exceeds a second signal level and the focus error signal searches to the first signal level, an operator does not mistake a timing for generating a braking signal, and a high precision focus pull-in ban be effected.

According to the invention of a fourth aspect, since said braking signal is made to generate, indicating a stop of operation at the energy such that the maximum relative velocity between the objective lens and the optical disk can be reduced to the pull-in limit velocity for said predetermined focus control, a reliable focus pull-in can be effected.

According to the invention of a fifth aspect, since a reversal of the relative velocity with an objective lens and an optical disk is detected, even if a brake is overpowered to cause the relative speed of the optical disk to reverse, the reverse is immediately detected to stop an application of the braking signal and a successful pull-in of the focus servo can be realizable.

Further, according to the invention of a sixth aspect, since an output time an/or an output level of said braking signal in response to the relative velocity is controlled and a braking signal of the optimum energy is applied to realize a successful pull-in of the focus servo. The relative velocity can be detected, for example, from a focus error signal detected in each layer of an optical disk having a plurality of recording layers.

According to the invention of a seventh aspect, from a time difference between a first detection time of a focus error signal which is detected by a first recording layer to be focused and a second detection time of the focus error signal which is detected by a second recording layer, since a method for computing the relative velocity is devised, the relative velocity can be detected with a simplified and low cost constitution.

In addition, the optical disk device of an eighth to fourteenth aspect can obtain the same effect as that of the focus pull-in method of a first to seventh aspect, repectively.

An object of the present invention to provide a focus pull-in method and an optical disk therefor in which even if the face deflection of a disk is large and the reproduction speed is fast, a focus servo can be certainly pulled in.

These and other objects, features, aspects, and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
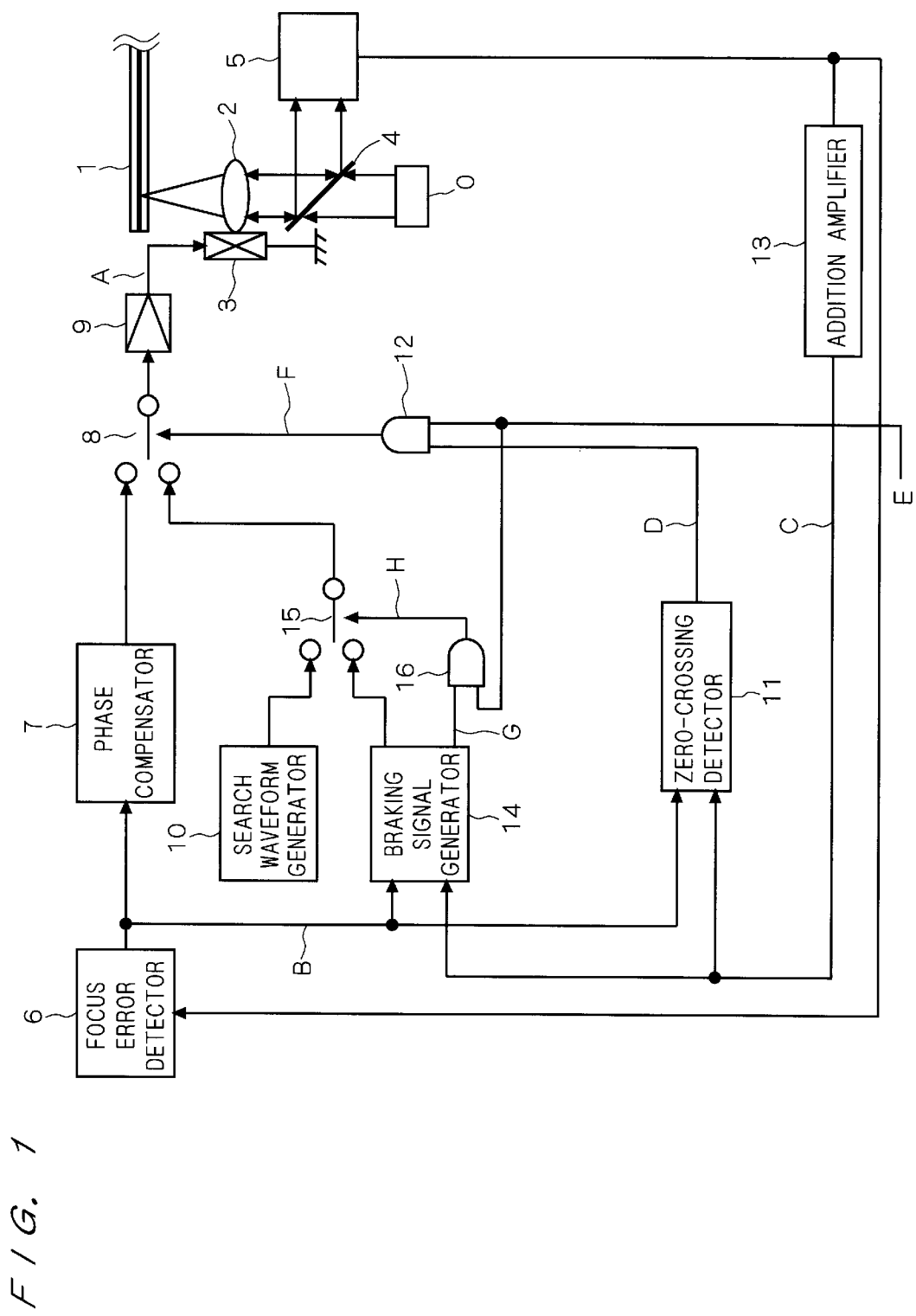
FIG. 1 is a block diagram of an optical disk in a first preferred embodiment according to the present invention.

A first preferred embodiment of the present invention will be described hereinafter. FIG. 1 is a block diagram of an optical disk device according to the first preferred embodiment of the present invention. In the figure, since reference numerals 0 to 13 are the same as or correspondent to the prior art examples, detailed description will be abbreviated. Reference numeral 14 is a braking signal generator, an input of which is formed by an output of focus error detector 6 or a focus error signal B and an output of the additional amplifier 13, while an output thereof is formed by a braking signal and a fourth control signal G. Reference numeral 15 is a change-over switch that, when a fifth control signal H is "H", a braking signal is selected, when a fifth control signal H is "L", a focus search signal is selected. Reference numeral 16 is an AND circuit which a fourth control signal G from the braking signal generator 14 and a second control signal E from a host device are input to fetch a logic product.

Figure 2:
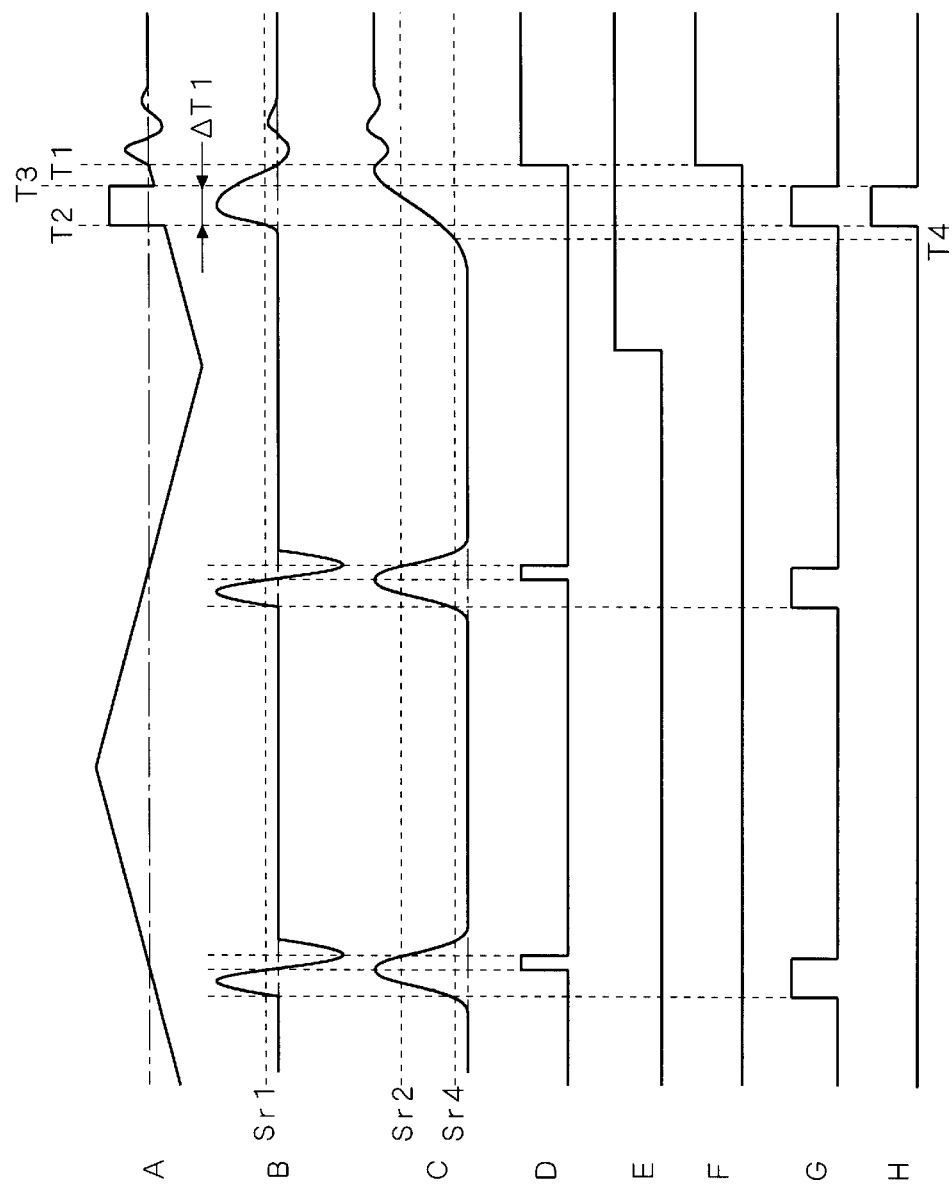
FIG. 2 is a view showing the behavior of each sort of signals in the optical disk in the first preferred embodiment according to the present invention.

FIG. 2 shows a behavior of each sort of signals in the above-noted optical disk device. Several signals A to F are the same or corresponding signals that are explained in the prior art examples. G is a fourth control signal which is output from the braking signal generator 14. H is a fifth control signal which counts a logical product of the fourth control signal G and the second control signal E. Sr 1 is a predetermined threshold value of a focus error signal which determines a timing T2 for outputting a braking signal. T2 is a timing for stopping an output of the braking signal and ΔT1 is a time for outputting a braking signal.

Figure 3:
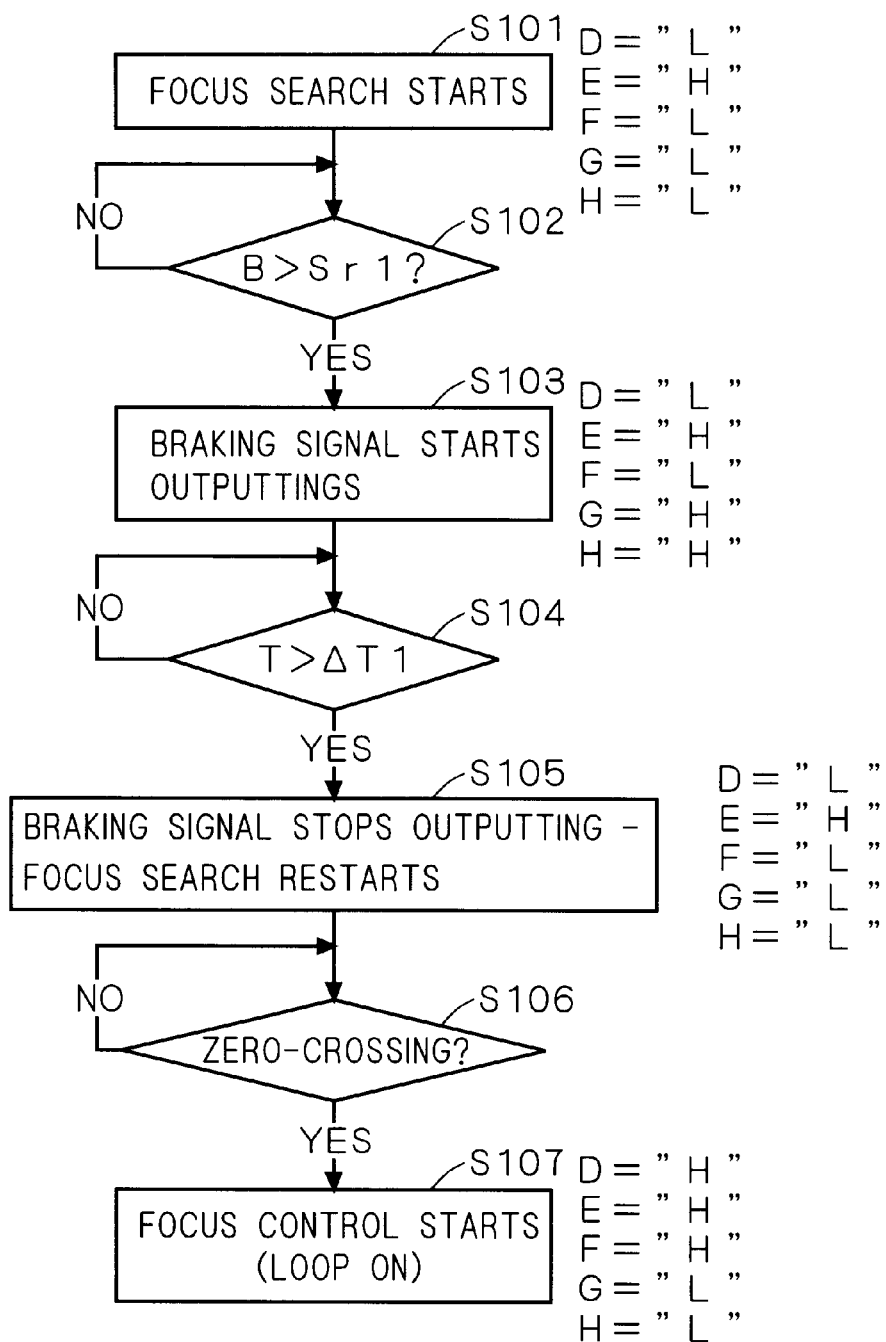
FIG. 3 is a flow chart showing a focus pull-in method in the first preferred embodiment according to the present invention.

FIG. 3 is a flow chart showing an operation of said optical disk device. Each sort of signals in FIG. 3 are the same as described in FIG. 3 are the same as described in FIG. 1 and FIG. 2.

When a face deflection of the optical disk 1 is large and a reproduction rate is fast, a method which detects a zero-crossing point T1 of the focus error signal to close a servo loop often leads to a failure in the pull-in of the focus control, as shown in a prior art example. The present preferred embodiment intends to solve such problems. It is a conceptual structure that before the focus error signal focuses to a recording layer of the optical disk 1, a braking signal from the braking signal generator 14 is output to a driver amplifier 9 via change-over switches 15 and 8, and a relative velocity between an objective lens 2 and an optical disk 1 can be reduced to a range such that the focus servo may effect a complete pull-in.

A detailed operation of the first preferred embodiment will be described using FIGS. 1 and 2. If it is not a mode for closing the focus control loop, the second control signal E from a host device becomes "L", In order to select a focus search signal in the change-over switch 15 and select an output from the change-over switch 15 in the change-over switch 8, a focus search signal is output in the driver amplifier 9. When it is a mode for closing a focus control loop, as the second control signal E from a host device becomes "H", in a third control signal F of the change-over switch 8, a first control signal D is valid, while in a fifth control signal H of the change-over switch 15, a fourth control signal G is valid. The braking signal generator 14 monitors a level of the input focus error signal, the fourth control signal G becomes "H" (at a time T2) when it reaches a predetermined threshold value Sr1, and the fourth control signal G becomes "L" (at a time T3) at a passage of a predetermined time Δ T1. At that time, when the second control signal E is "H", the fifth control signal H is equal to the fourth control signal G, the change-over switch 15 selects the braking signal for a time ΔT1. Next, at a time when the focus error signal effects a zero-crossing, the first control signal D becomes "H". As the second control signal E is also "H", the focus control signal is selected at the change-over switch 8 and the focus control loop is closed (at a time T1).

The threshold value Sr1 is, preferably, set to about a quarter of a peak value of the focus error signal, because, if such setting is made to this extent, a noise component which is superposed on the focus error signal is not detected by mistake and the present invention can be realized. Further, a magnitude of noise component is previously detected and even if the threshold value is set up to several times of noise component, the same effect can be obtained.

The energy for stopping the disk device as said braking signal indicates, is decided by (1) a maximum reproduction speed of the disk device to be designed, (2) a maximum face deflection which is determined by the standard of an optical disk to be reproduced, and (3) a speed of focus search. When a DVD is used for a reproduction disk and a rotational frequency of the most inner circumference is about 90 Hz, the speed of focus search is 10 mm/sec, and a deflection quantity at the most inner circumference is ±125 $\mu$m, the maximum face deflection velocity of the optical disk 1 is about ±70 mm/sec. Suppose that pull-in limit velocity of focus servo is 30 mm/sec, it is necessary for the braking signal to reduce the maximum relative velocity 80 mm/sec to the pull-in limit velocity for focus control 30 mm/sec and provide the energy for such reduction. Therefore, a time ΔT1 for outputting said braking signal (or a level of the braking signal) is decided to become equal to the above-noted energy.

As shown above, an output of the braking signal generator 14 is formed only by a focus error signal. But in a case detected only by the focus error signal, when a laser spot passes through not a recording layer but a surface of the optical disk, a pseudo focus error signal is often detected and a timing for outputting a braking signal may be incorrectly detected. To deal with such a case, as shown in FIG. 1, all addition signal is input to a braking signal generator 14 and a first threshold value Sr1 is detected based on the focus error signal when all addition signal is over a predetermined threshold value Sr4 (a time T4 in FIG. 2), thereby it is possible to effect a high precision focus control pull-in method.

The above result will be applicable to second and third preferred embodiments to be mentioned later.

A flow of operation of the optical disk system in the first preferred embodiment using a flowchart of FIG. 3 will be described. In a step S101, the system starts a focus search operation and shifts to a step S102. The system monitors whether the focus error signal exceeds a predetermined threshold value Sr1 or not in S102. When less than Sr1, the system continues the focus search operation, and when over Sr1, the system shifts to S103, where a fourth control signal G and a fifth control signal H will be "H" to start an output of the braking signal. In a step S104, the system monitors an output time of the braking signal and continues to output the braking signal until the output time attains to ΔT1. When the output time of the braking signal attains to ΔT1, the system shifts to S105, the fourth control signal G and the fifth control signal H become "L" to start the focus search operation again. The system detects a zero-crossing of the focus error in S106. When zero-crossing is detected, the system shifts to S107, where both the first control signal D and the third control signal F become "H", and the focus control loop is closed to start the focus control.

Second Preferred Embodiment

Figure 4:
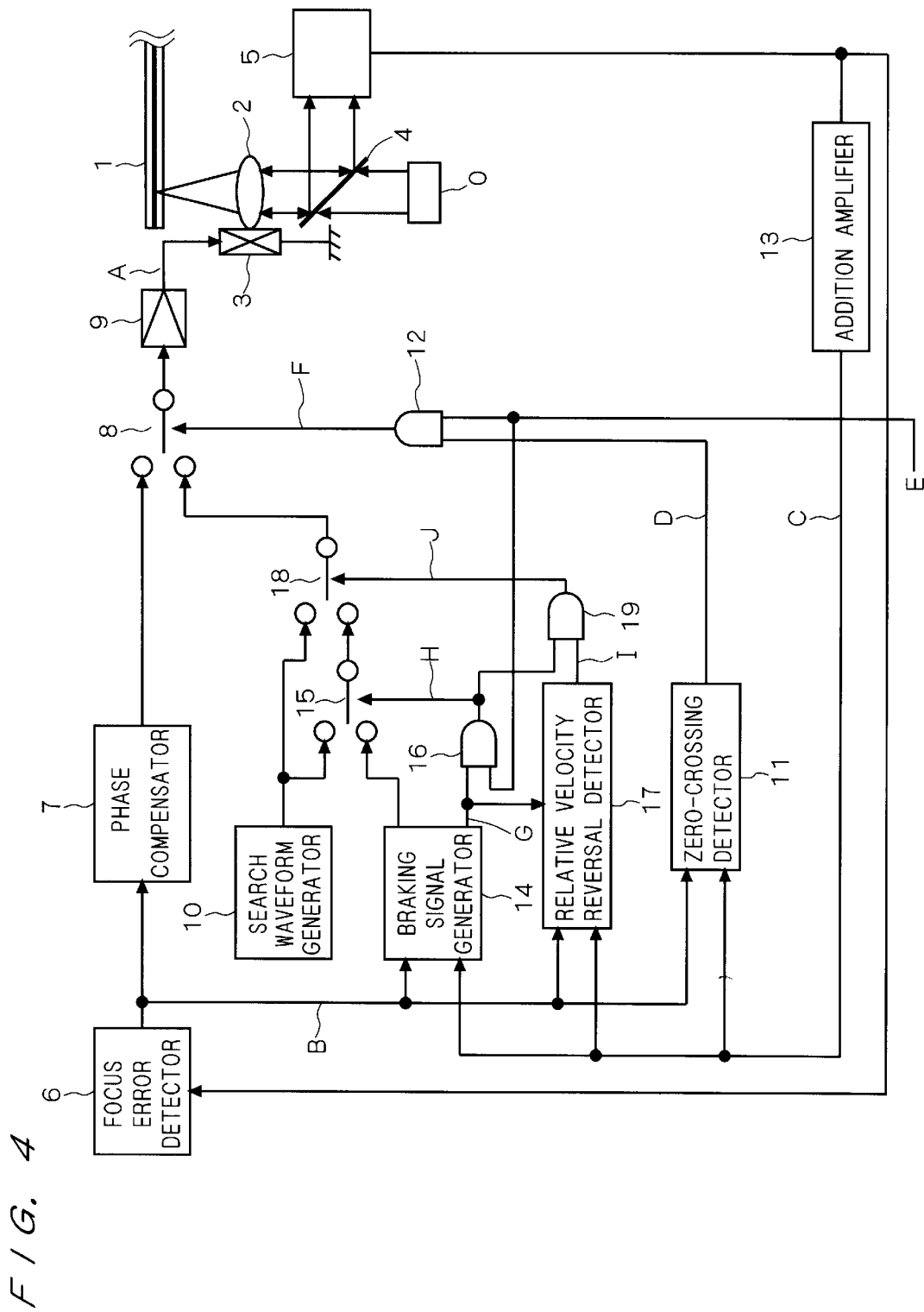
FIG. 4 is a block diagram of the optical disk in a second preferred embodiment according to the present invention.
Figure 5:
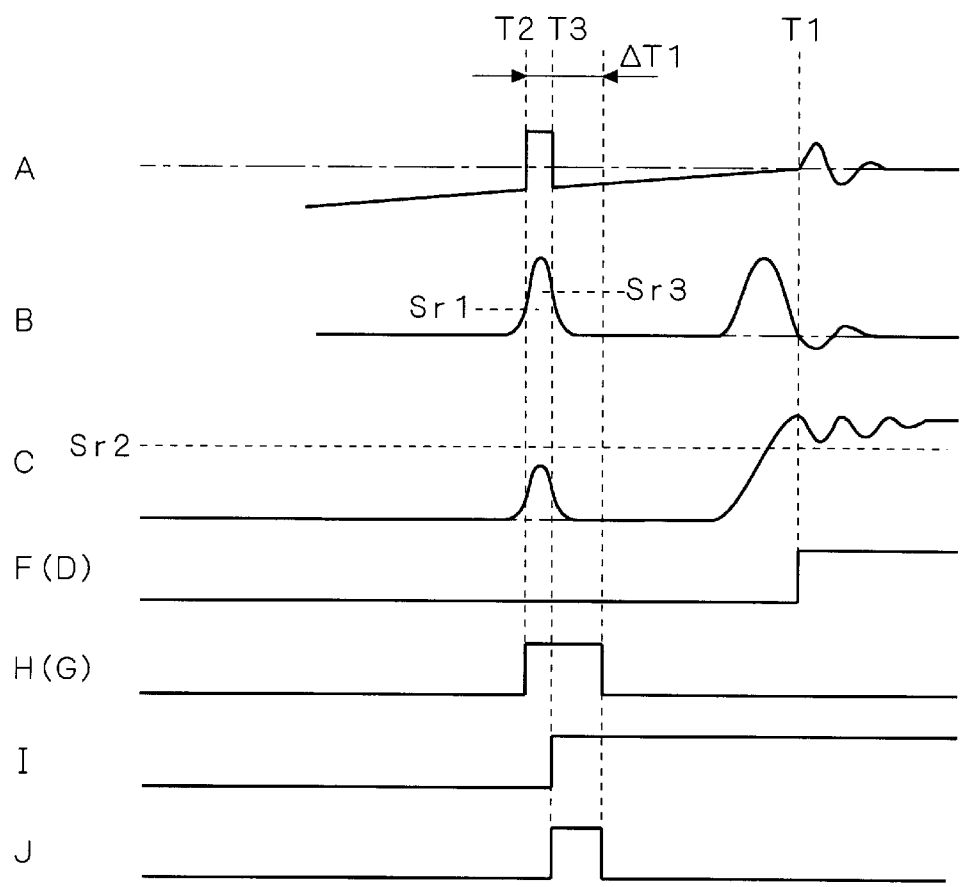
FIG. 5 is a view showing the behavior of each sort of signals in the optical disk of the second preferred embodiment according to the present invention.

Next, an optical disk device according to the second preferred embodiment of the present invention will be described. FIG. 4 is a block diagram of an optical disk device according to the present preferred embodiment. In the figure, as reference numerals 1 to 16 are of the structure which is the same as or corresponds to the first preferred embodiment, detailed description will be omitted. Reference numeral 17 is a relative velocity reversal detector; 18 a change-over switch which, when a sixth control signal J is "L", an output of the change-over switch 15 is selected and when the sixth control signal J is "H", a focus search signal is selected;19 an AND circuit which counts a logical product of a sixth control signal I and a fifth control signal H and outputs a sixth control signal J. FIG. 5 is a view showing the behavior of each signal in the present preferred embodiment. Sr3 is a predetermined threshold value of a focus error signal; I a sixth control signal which is output from a relative velocity reversal detector 17 and is "L" as usual and is "H" when the reversal of the relative velocity is detected; J a seventh control signal which counts a logical product of a fifth control signal H and a sixth control signal I, and outputs a sixth control signal J. In the figure, as other each sort of signals is the same as described in the first preferred embodiment, the description will be omitted. In FIG. 5, an illustration of the first control signal D and the fourth control signal G is omitted, since both signals coincides with the third control signal F and the fifth control signal H, respectively.

Figure 6:
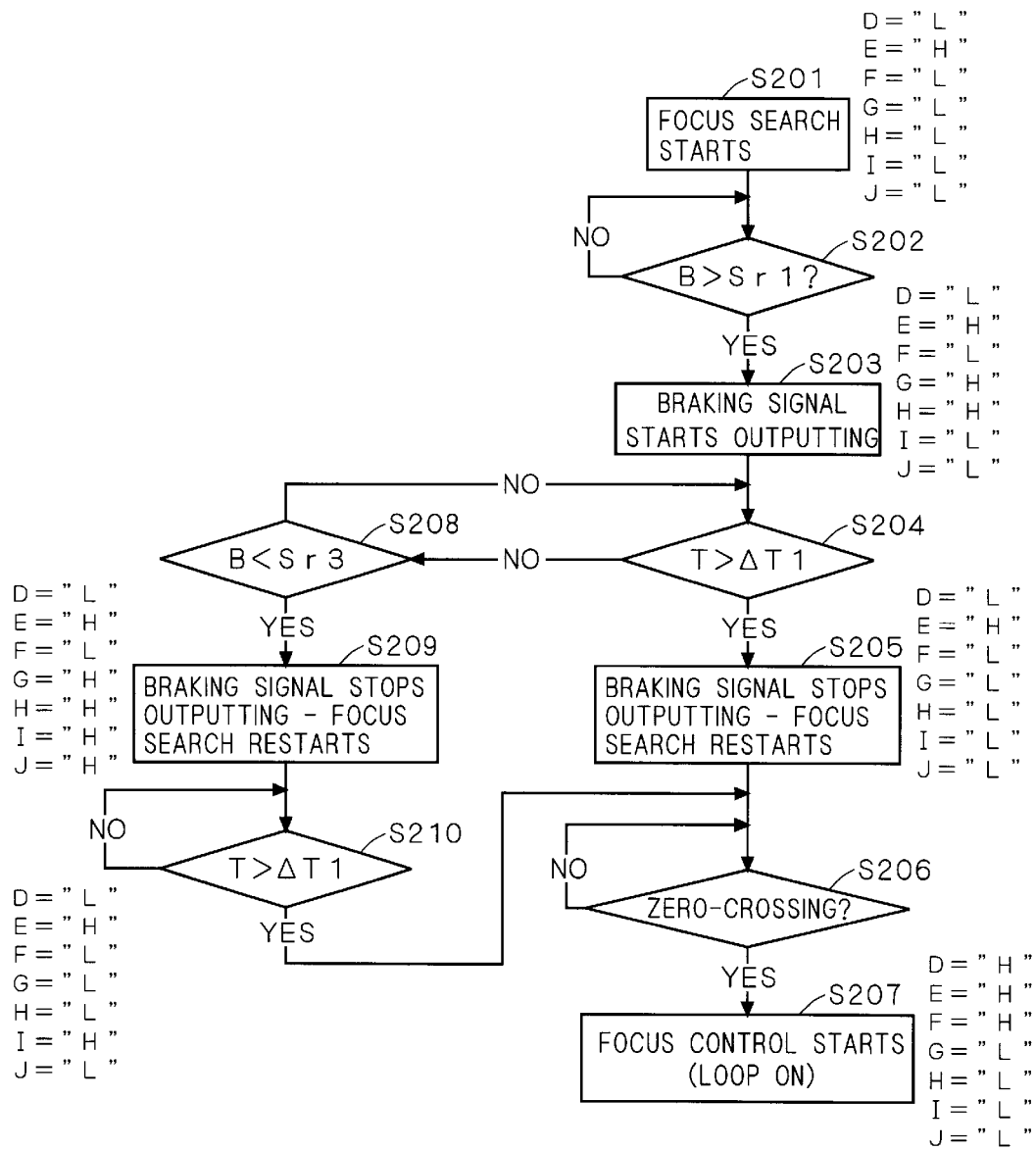
FIG. 6 is a flow chart showing a focus pull-in method in the second preferred embodiment according to the present invention.

FIG. 6 is a flow chart showing a flow of the operation of the optical disk device according to the present preferred embodiment. As each sort of signals in FIG. 6 are the same as described in FIGS. 4 and 5, the description is omitted.

In the first preferred embodiment, the energy of a braking signal is set by considering a case when the relative velocity between the objective lens 2 and the optical disk 1 is maximum. That is, when the relative velocity of the objective lens 2 and the optical disk 1 is less than the maximum value, if the braking signal is applied thereto, the relative velocity is delayed more than necessary, as the case may be, the relative velocity is reversed and the objective lens 2 goes away from the optical disk 1, and it is used to fail in closing the focus control loop. To solve such problems in the first preferred embodiment, the second preferred embodiment has been developed. If the relative velocity reversal detector 17 detects a reversal of the relative velocity, it switches a change-over switch 18 to a focus search signal. And again, until it reaches to a zero-crossing point T1 of the focus error signal, the objective lens 2 is moved to close the focus control loop. Thus, the second preferred embodiment is provided with a structure that a stable focus pull-in method can be executed.

Using FIGS. 4 and 5, a detailed operation of an optical disk device in the second preferred embodiment will be described. A precondition is that an instruction which closes the focus control loop has already been sent from a host device and a second control signal E has been "H." When a focus error signal has reached a first threshold value Sr 1, a fourth control signal G and a fifth control signal H because "H" and a braking signal is selected in the change-over switch 15. Since a sixth control signal 1 from the relative velocity reverse detector 17 is "L," a seventh control signal J which is an output of AND circuit 19 is also "L," an output of the change-over switch 15 come to be selected at the change-over switch 18 and a braking signal which was amplified by the driver amp 9 is applied to the focus actuator 3.

When the relative velocity between the objective lens 2 and the optical disk 1 is maximum, the energy of this braking signal is set such that the focus control may be stably pulled-in. That is, when the relative velocity is maximum, it is in principle impossible that for a time $\Delta T1$ which is outputting a braking signal, the focus error signal reduces and becomes less than a predetermined threshold value Sr 3. On the contrary, a fact that the focus error signal becomes less than a predetermined threshold value Sr 3 denotes that the relative velocity between the objective lens 2 and the optical disk 1 has reversed, where the threshold value Sr 3 is a value which is set to be an index as described above. Therefore, the relative velocity reversal detector 17 detects that the focus error signal which is outputting the braking signal, becomes less than a predetermined threshold value Sr 3, thereby detecting a reversal of the relative velocity of the objective lens 2 and the optical disk 1.

A focus error signal, all addition signal and a fourth control signal G are input to the relative velocity reversal detector 17. In a braking signal output period (a period which the fourth control signal G is "H"), if the focus error signal reduces and becomes less than a predetermined threshold value Sr 3 and/or all addition signal reduces for a predetermined term, the sixth control signal I becomes "H" (at a time T3). Since a seventh control signal J is a signal which a logical product of a fifth control signal H and a sixth control signal I is counted and for a term which outputs the braking signal, a fifth control signal H is "H," a seventh control signal J which is an output of an AND circuit 19 depends on a sixth control signal I. In the change-over switch 18, when the seventh control signal J becomes "H," the focus search signal is selected, and shifts to a focus search operation. And until a zero-crossing of the focus error signal is detected, the search operation continues and a third control signal F becomes "H" at a time which a zero-crossing point T1 is detected by a zero-crossing detector 11. The focus control signal is selected by the change over switch 8 to close a focus control loop.

Even in the course of outputting the breaking signal, at a time when a reversal of the relative velocity between an objective lens 2 and an optical disk 1 is detected, since an output of the braking signal is suspended by a braking signal suspension means formed by a constitution part 17 to 19 to shift instantly to the focus search operation, even if the relative velocity between the objective lens 2 and the optical disk 1 is reversed, it is possible to pull-in a stable focus control.

Next, using a flow chart of FIG. 6, a flow of the second preferred embodiment will be described. Each sort of signals in FIG. 6 is the same as described in FIGS. 4 and 5. A focus search operation starts at a step S202 and shifts to a step S202. Whether or not a focus error signal exceeds a predetermined value Sr 1 is monitored at a step S202. If the focus error signal is less than Sr 1, the focus search operation continues, while if more than Sr 1, the focus search operation shifts to S203 and a forth control signal G becomes "H." In this case, however, as a second control signal E is also "H," a fifth control signal H becomes "H" and an output of the braking signal starts. At a step S204, an output time of the braking signal is monitored and until an output time becomes $\Delta T1$, the braking signal continues to output.

For a term of $\Delta T1$ in a step S204, when a relative velocity of the objective lens 2 and the optical disk 1 does not reverse, as the same operation as described in the first preferred embodiment is effected, a description will be omitted. In a step of S204 when the braking output time is within $\Delta T1$, the process shifts to a step of S208. In a step of S208, whether or not the focus error signal is less than a predetermined value Sr 3 is discriminated. When the level of the focus error signal exceeds Sr 3, the process returns to S204 again to continue outputting a braking signal. If the level of a focus error signal is less than Sr 3, the process decides that the relative velocity of the objective lens 2 and the optical disk 1 is reversed and shifts to S209. Then, a sixth control signal I becomes "H," and as a fifth control signal is "H" for an output term of the braking signal, a seventh control signal J is "H" and the process shifts to a focus search operation again. As a step of S210, a time since the braking signal has been output is being monitored and until a time of $\Delta T1$ expires, the focus search operation continues. At a step S210, after a time of $\Delta T1$ expires, a fifth control signal H is "L," and as a seventh control signal J also becomes "L," the process keeps the focus search operation and shifts to S206. At a step of S206, a zero-crossing of the focus error signal is detected and until a detection of zero-crossing has been completed, the process continues the search operation. When zero-crossing has been detected, the process shifts to S207 and as a first control signal D is "H" and a third control signal F is also "H," the focus control loop closes and the focus control starts.

Third Preferred Embodiment

Figure 7:
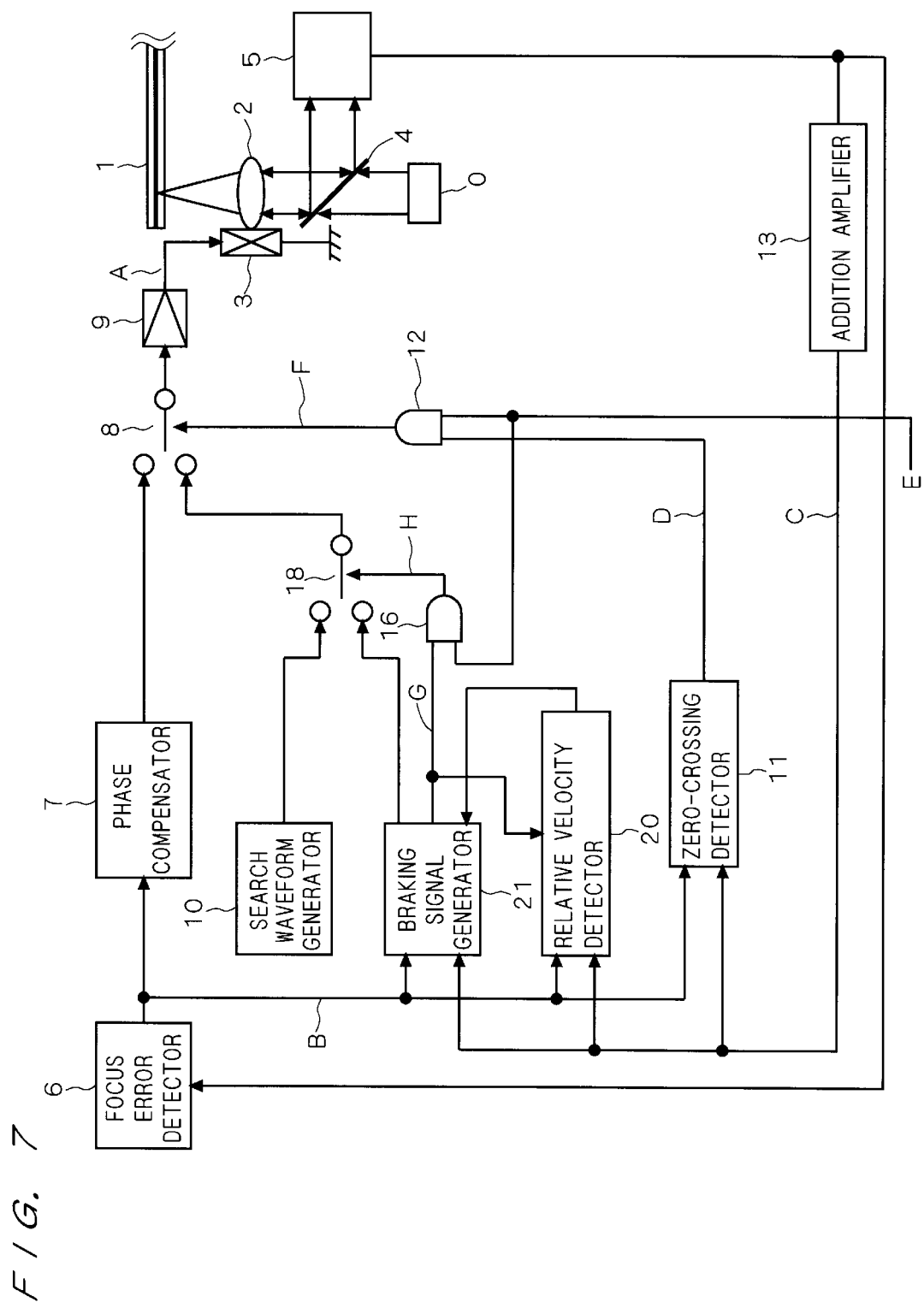
FIG. 7 is a block diagram of the optical disk in a third preferred embodiment according to the present invention.
Figure 8:
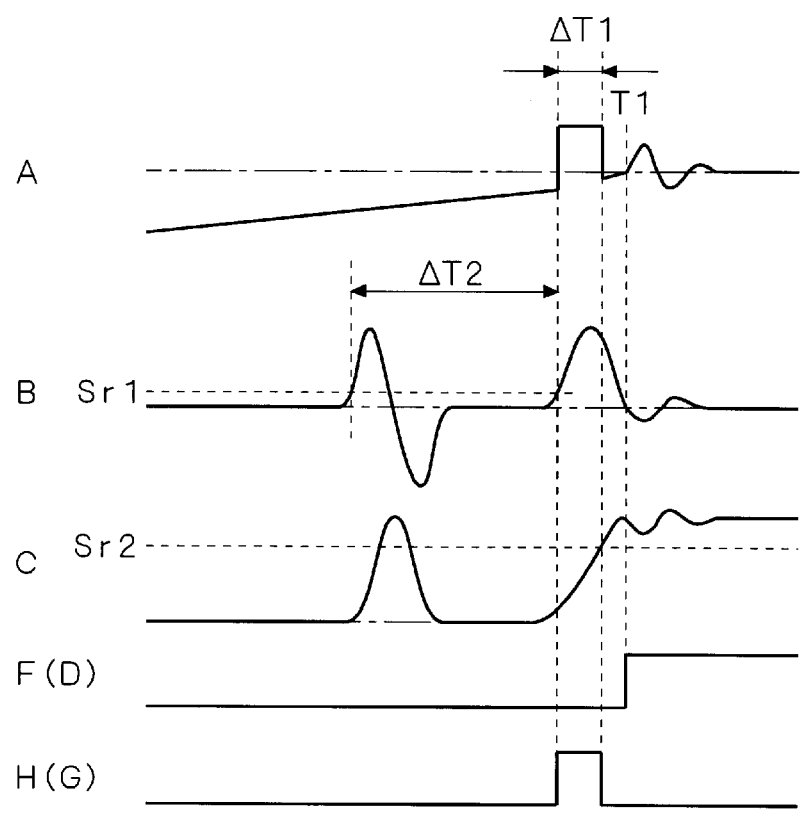
FIG. 8 is a view showing the behavior of each sort of signals in the optical disk of the third preferred embodiment according to the present invention.
Figure 9:
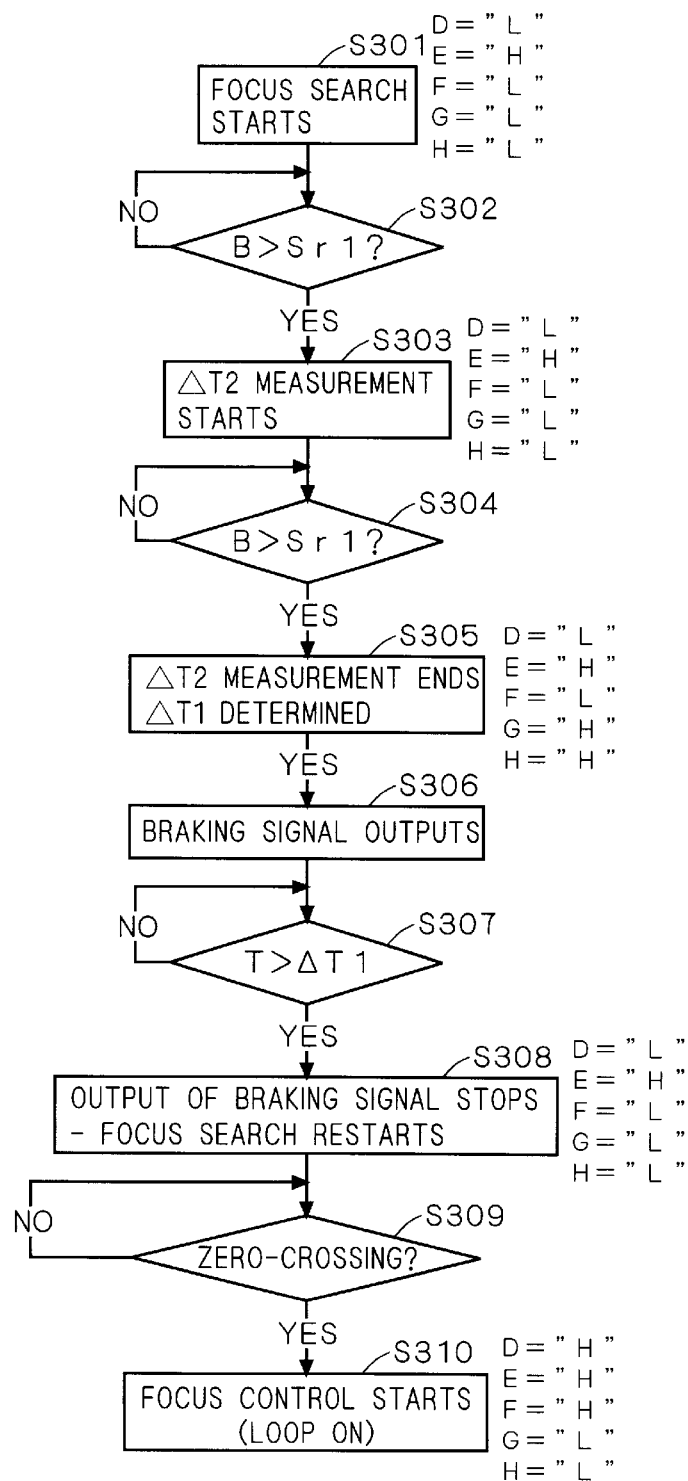
FIG. 9 is a flow chart showing a focus pull-in method in the third preferred embodiment according to the present invention.
Figure 10:
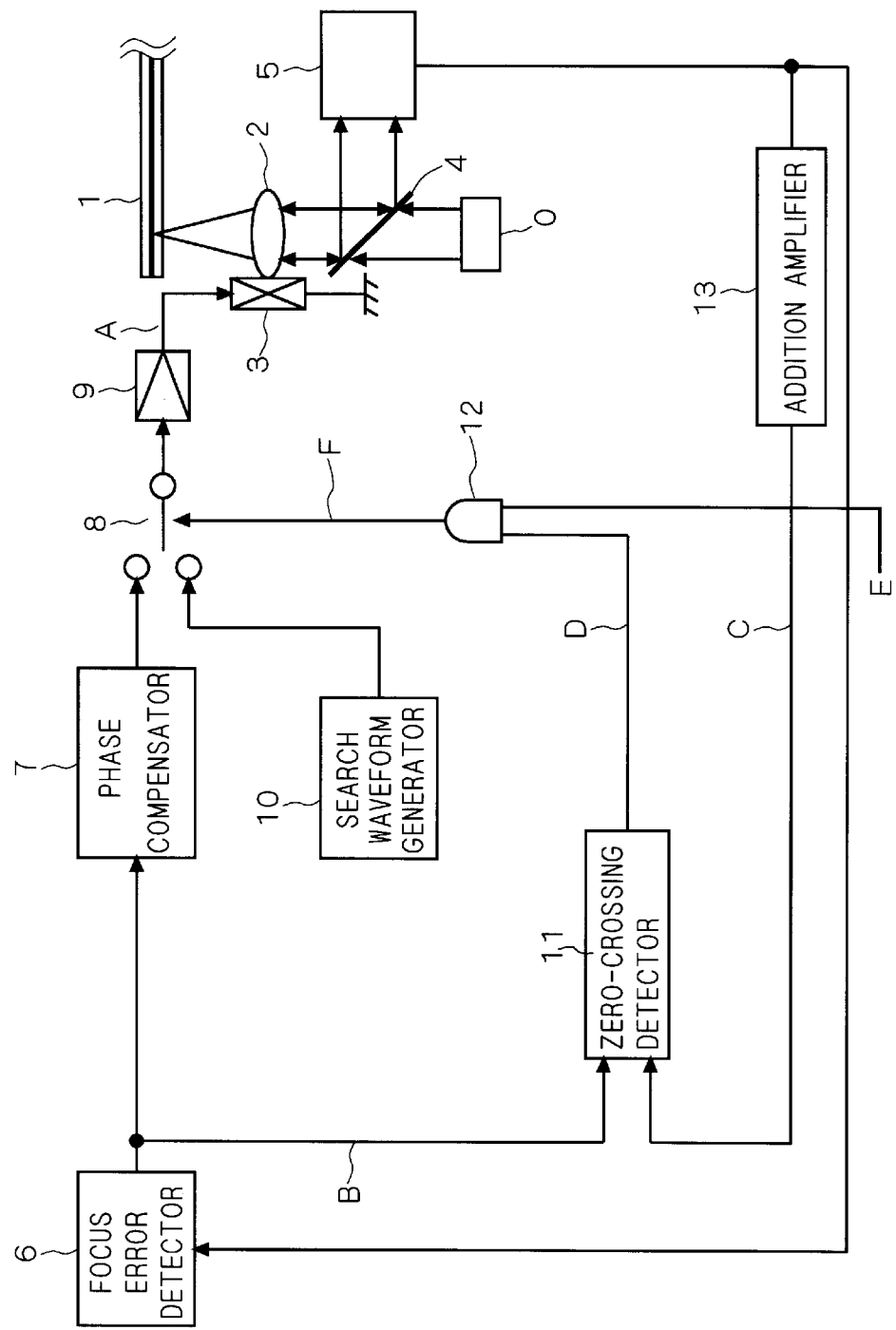
FIG. 10 is a block diagram of a prior art optical disk device.
Figure 11:
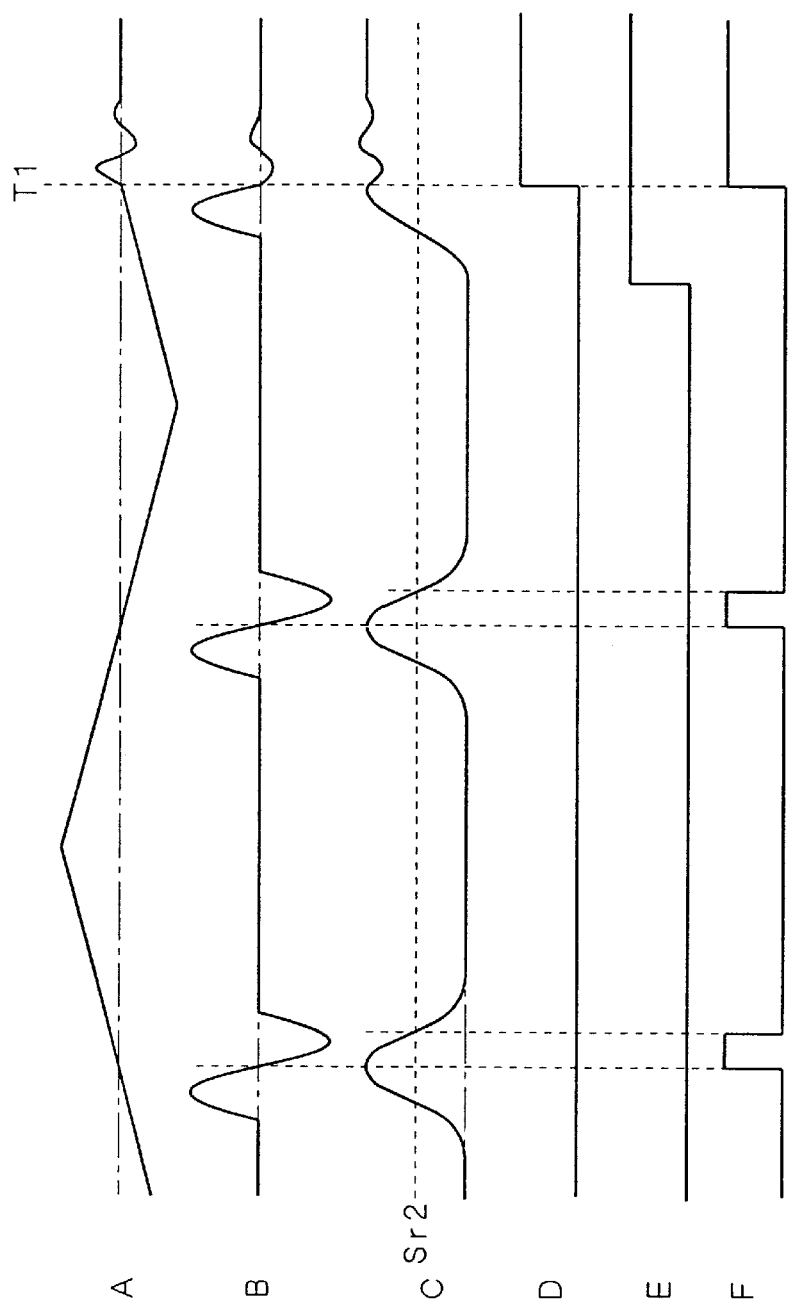
FIG. 11 is a view showing the behavior of each sort of signals in a prior art optical disk device.
Figure 12:
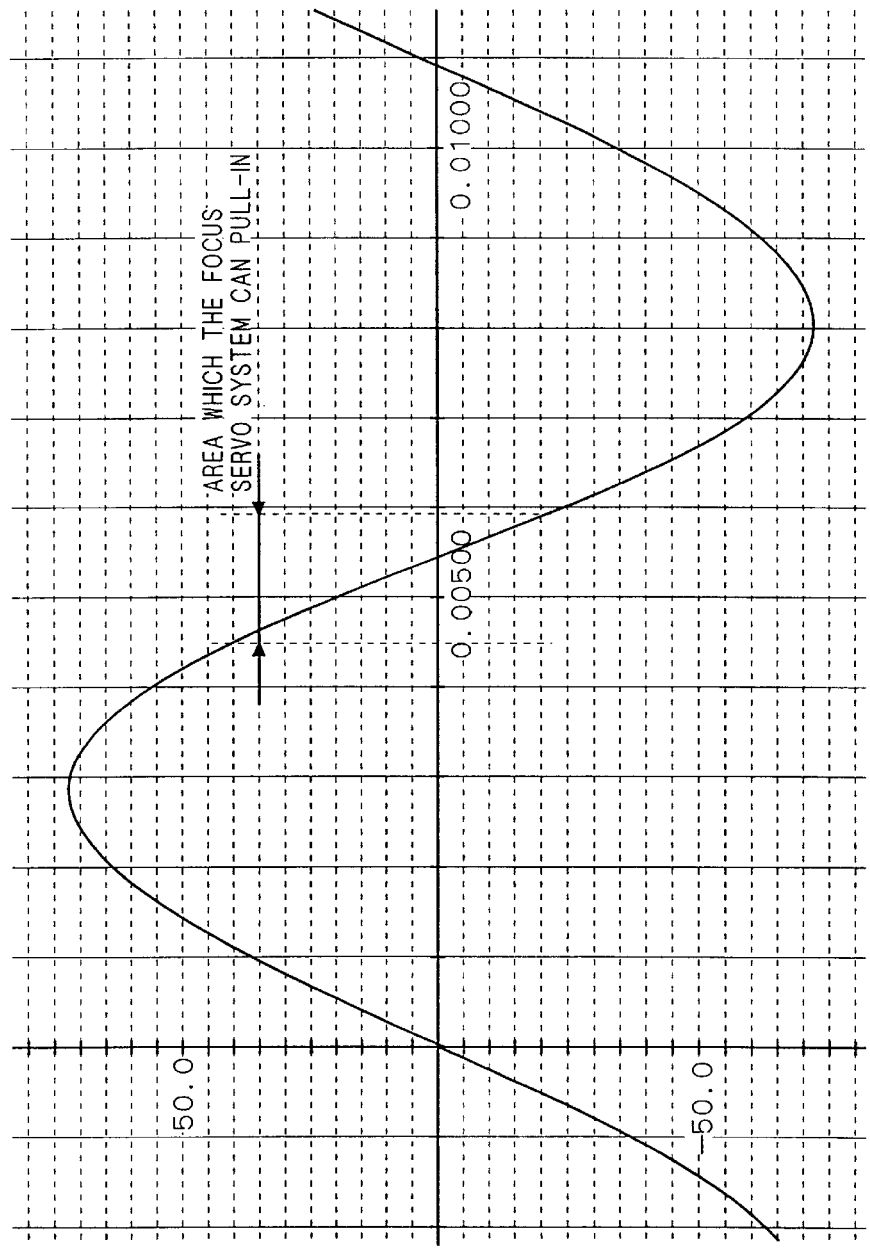
FIG. 12 is a view showing a relationship of the relative velocity between an optical disk and an objective lens.

A third preferred embodiment of the present invention will be described hereinafter. FIG. 7 is a block diagram of an optical disk device according to the third preferred embodiment. In the figure, as reference numeral 0 to 16 is of the same as or corresponding to a constitution as described above, detailed description will be abbreviated. Reference numeral 20 is a relative velocity detector for detecting a relative velocity between the objective lens 2 and the optical disk 1, 21 a braking signal generator which outputs a braking signal corresponding to velocity information from the relative velocity detector 20 and outputs a fourth control signal G for controlling a change-over switch 15. FIG. 8 is a waveform view showing a behavior of each sorts of signals in the present third preferred embodiment. In the figure, as each sort of signals other than G are the same as described in the above-noted preferred embodiments, the description thereof will be omitted. FIG. 9 is a flow chart showing a flow of the operation of the optical disk according to the present preferred embodiment.

In a disk having a plurality of recording layers in a depth direction of the disk, each interlayer distance is very close of about some ten $\mu$m. Therefore, in a case where a method described in the second preferred embodiment is used, if the relative velocity of the objective lens 2 and optical disk 1 is reversed, a layer to pull-in the focus control is missed and it is afraid that the focus control is pulled-in to an incorrect layer. The optical disk device according to the present preferred embodiment is devised to solve such problems. A relative velocity detector 20 measures a time between each focus error signals which are detected in each layer of a multi-layer disk, thereby detecting the relative velocity between the objective lens 2 and optical disk 1 and outputting an appropriate braking signal in response to the speed. Therefore, the constitution of the present optical disk device features that without generating a reversal of the relative velocity, a pull-in method of focus control can be effected.

Then, when two layers disk of DVD is applied to the optical disk 1, an operation of the optical disk device will be described. In the relative velocity detector 20, a first predetermined threshold value Sr 1 of a focus error signal of a recording layer which is detected for the first time in the course of focus search operation and a second predetermined threshold value Sr 1 of a focus error signal of a next recording layer which is detected next are calculated and then a time interval $\Delta$ T2 between a first and a second predetermined threshold values is measured. Since a distance between a first detected recording layer and a next detected recording layer is determined in advance by a DVD standard, if his interlayer distance (for example, 40 $\mu$m) is divided by $\Delta$T2, the relative velocity to the objective lens 2 and to the optical disk 1 can be detected. In this case, the two-layer disk of DVD is described as an example. In a multi-layer disk different from DVD, if an interlayer distance $\Delta$T2 specified by the present disk standard is divided by $\Delta$T2, the relative velocity could be detected in the same way.

The relative velocity of an objective lens 2 and an optical disk 1 detected by the relative velocity detector 20 is input to a braking signal generator 21. The braking signal generator 21 changes an output time $\Delta$T1 of the braking signal, so that a reversal of the relative velocity may not occur and can close a focus control loop stably, based on the relative velocity. For example, in a double-layer disk of DVD, when the objective lens 2 is moved from down to up in order to reproduce a recording layer of a deep layer and when the objective lens 2 is moved from upward to downward in order to reproduce a recording layer of a surface layer, if the focus control is pulled-in, since a focus error signal of another recording layer is detected before a target recording layer. Therefore, the relative velocity of the objective lens 2 and the optical disk 1 is detected, and a stable pull-in method for focus control to each layer can be realized.

In the present preferred embodiment, the energy of the braking signal is adjusted by changing an output time of the braking signal, but by adjusting a signal level of the braking signal the same effect could be obtained. In order to detect the relative velocity in the present, a time until the focus error signal in the face layer and the deep layer reaches to a predetermined threshold value Sr 1 is used, but on the other hand, by detecting a time between an upper side peak and a lower side peak of a focus error signal detected for the first time, the same effect can be obtained. Further, by detecting the relative velocity with the objective lens 2 and the optical disk 1 from (a) the focus error signal of a layer other than a layer to which the focus control is applied, or (b) the focus error signal of a plurality of layers other than a layer to which the focus control is applied, the same effect can be obtained.

The operation of the third preferred embodiment will be described by a flow chart shown in FIG. 9. Each sort of symbols in FIG. 9 are the same as described in FIG. 7, FIG. 8 or the like. In a step S301, the process of this system starts an operation of focus search and shifts to S302. At S302, a focus error signal monitors whether or not the focus error signal exceeds a predetermined threshold value Sr 1. If the signal is over Sr 1, the processes shifts to S303 and a measurement of a time $\Delta$ T2 up to the focus error signal to be detected next starts. At S303, the process monitors whether or not the focus error signal to be detected in the next layer exceeds a predetermined threshold value Sr 1. If the signal>Sr 1, the process shifts to S305 and a measurement of $\Delta$T2 terminates. At S306, since a fourth control signal G and a fifth control signal H become "H," the braking signal starts outputting. At S307, an output time of the braking signal is monitored, and until the output time is $\Delta$T1, the process continues to output the braking signal. When the output time of the braking signal attains to $\Delta$T1, the process shifts to S308 and the fourth control signal G and the fifth control signal H becomes "L" and starts the focus search operation again. At S309, a zero-crossing of the focus error is detected, and until the zero-crossing is detected, the process continues its search operation. Once the zero-crossing is detected, the process shifts to S310 and then the first control signal D and the third control signal F become "H" and then the focus control loop is closed to start the focus control.

A focus pull-in method and an optical disk device which combines the first, second and third preferred embodiments may be considered. That is, before a process for focus pulling-in of the optical disk is effected, means for discriminating whether said optical disk has only one layer of recording layer or a plurality of recording layers, is provided separately; based on the discrimination result of said means, in a case of one layer, focus pulling-in is effected by the first or second preferred embodiments, and in case of two or more layers, focus pulling-in is effected by the third preferred embodiment. By such constitution, the more appropriate focus pull-in process is possible in response to the kinds of the optical disk media and it is expected to enhance the reliability of the device.

In the description of the above preferred embodiments, DVD (DVD-ROM) is shown as an example. The present invention features that an optical spot is formed on a recording surface of the optical disk and it is able to apply to a general device which effects a focus control of the spot and the same effect can be obtained. For example, the same effect may be obtained with regard to a device which records or reproduces an optical disk or an magnet-optic disk, such as CD, CD-R, CD-R/W, DVD, DVD-R, DVD-RAM, DVD-R/W, MO, and MD.

While the invention has been shown and described in detail, the foregoing description is in all aspects illustrative and not restrictive. It is therefore understood that numerous other modifications and variations can be devised without departing from the scope of the invention.

What is claimed is:

1. A focus pull-in method for pulling-in a light spot irradiated through an objective lens onto a recording layer of an optical disk using a focus actuator which can move a position of said objective lens, comprising the steps of:

(a) applying a search voltage to said focus actuator to drive said objective lens to a direction for approaching to a focusing plane of said optical disk;

(b) detecting whether or not a focus error signal which is based on a reflected light from said optical disk attains a first signal level;

(c) applying a braking signal indicating a stop of operation to said focus actuator, when it is detected in said step (b) that said focus error signal reaches said first signal level during a term for allowing a control start of a predetermined focus control; and (d) starting said predetermined focus control, when a zero-crossing of said focus error signal is detected in the term for allowing said control start, wherein said step (c) includes a step of applying said braking signal, when it is detected that all addition signals based on a reflected light from said optical disk exceed a second signal level and said focus error signal reaches said first signal level in the term for allowing said control start.

2. The focus pull-in method according to claim 1, wherein said step (b) is performed in which said first signal level is set to a quarter extent level of a peak value of said focus error signal or several times extent of a noise component superposed on the focus error signal.

3. The focus pull-in method according to claim 1, wherein said braking signal applied by said step (c) indicates a stop of operation at the energy such that the maximum relative velocity between said objective lens and said optical disk can be reduced to the pull-in limit velocity for said predetermined focus control.

4. The focus pull-in method according to claim 1, wherein said step (c) includes a step of stopping the application of the braking signal, when a reversal of relative velocity between said objective lens and said optical disk is detected in the course of applying said braking signal.

5. The focus pull-in method according to claim 1 further comprising a step of:

(e) obtaining the relative velocity between said objective lens and said optical disk, wherein said step (c) includes a step of controlling an output time and/or an output level of said braking signal in response to said relative velocity obtained by said step (e).

6. The focus pull-in method according to claim 6, wherein said optical disk includes a first and second recording layers, and said step (e) includes a step of obtaining a first detection time of said focus error signal detected with respect to said first recording layer and a second detection time of said focus error signal detected with respect to said second recording layer, to obtain said relative velocity based on a time difference between said first and second detection times.

7. An optical disk device having a focus control loop and a focus search loop, comprising:

an objective lens for forming a light stop on a recording layer of an optical disk;

an optical detector that receives a reflected light from said optical disk for outputting a focus error signal based on the received reflected light;

a search waveform generator that generates a search voltage for driving said objective lens to a direction which approaches to a focusing plane of said optical disk in response to a focus search instruction;

a braking signal generator that generates a braking signal indicating a stop of operation to said focus actuator, when it is detected that said focus error signal reaches said first signal level during a term for allowing a control start of a predetermined focus control;

a zero-crossing detector that detects that a focus error signal reaches a state of zero-crossing; and a switching device that reopens said predetermined focus control, when said zero-crossing detector detects zero-crossing during the term for allowing said control start, wherein said optical detection means comprises:

a photoelectric conversion element for providing a photoelectric conversion signal by photoelectric conversion of said reflected light; and an addition amplifier for totally adding said photoelectric conversion signal obtained from each area of said photoelectric conversion element to obtain all addition signals, wherein said braking signal generator generates said braking signal, when said all addition signals exceed a second signal level and said focus error signal reaches said first signal level during the term for allowing said control start.

8. The optical disk device according to claim 7, wherein said first signal level includes a quarter extent level of a peak value of said focus error signal or several times extent level of a noise component superposed on the focus error signal.

9. The optical disk device according to claim 7, wherein said braking signal includes a signal that indicates a stop of operation at the energy which can reduce the maximum relative velocity between said objective lens and said optical disk to a pull-in limit velocity of said predetermined focus control.

10. The optical disk device according to claim 7, further comprising:

a braking signal suspension means having a relative velocity reversal detector for detecting a reversal of the relative velocity between said objective lens and said optical disk, based on said focus error signal, for stopping an application of said braking signal, when said relative velocity reversal detector detects a reversal of said relative velocity during an application of said braking signal.

11. The optical disk device according to claim 7, further comprising:

a relative velocity detector for detecting relative velocity between said objective lens and said optical disk, based on said focus error signal, wherein said braking signal generator controls an output time and/or an output level of said braking signal in response to said relative velocity.

12. The optical disk device according to claim 11, wherein said optical disk includes a first and second recording layer, and said relative velocity detector obtains said relative velocity from a lime difference between a first detection time of a focus error signal detected with respect to said first recording layer and a second detection time of a focus error signal detected with respect to said second recording layer.

* * * * *